United States Patent [19]
Takeda et al.

[11] Patent Number: 5,404,673
[45] Date of Patent: Apr. 11, 1995

[54] POWER WINDOW APPARATUS WITH SAFETY DEVICE

[75] Inventors: Hitoshi Takeda; Keiichi Tajima; Toru Nakayama, all of Shizuoka, Japan

[73] Assignee: Koito Manufacturing Co., Ltd., Tokyo, Japan

[21] Appl. No.: 78,643

[22] Filed: Jun. 21, 1993

[30] Foreign Application Priority Data

Jun. 26, 1992 [JP] Japan .................. 4-050439 U
Oct. 8, 1992 [JP] Japan .................. 4-293973

[51] Int. Cl.$^6$ ............................................. E05F 15/16
[52] U.S. Cl. ................................. 49/28; 49/349; 49/352; 318/266; 318/282; 318/468; 318/470
[58] Field of Search ............ 49/28, 26, 349, 352; 318/256, 264, 265, 266, 282, 467, 468, 469, 470

[56] References Cited

U.S. PATENT DOCUMENTS

| | | |
|---|---|---|
| 4,634,945 | 1/1987 | Takemura et al. ............... 49/28 X |
| 4,641,067 | 2/1987 | Iizawa et al. ................... 49/28 X |
| 4,686,598 | 8/1987 | Herr ............................ 49/28 X |
| 4,709,196 | 11/1987 | Mizuta . |
| 4,870,333 | 9/1989 | Itoh et al. . |

FOREIGN PATENT DOCUMENTS

| | | |
|---|---|---|
| 2147432 | 5/1985 | European Pat. Off. . |
| 0525788A1 | 2/1993 | European Pat. Off. . |
| 3329717 | 5/1984 | Germany . |
| 3829405 | 8/1990 | Germany . |
| 3303590 | 9/1994 | Germany . |
| 1384974 | 2/1973 | United Kingdom . |

OTHER PUBLICATIONS

German Office Action dated 20 Jul. 1994 (with translation).

*Primary Examiner*—Philip C. Kannan
*Attorney, Agent, or Firm*—Sughrue, Mion, Zinn, Macpeak & Seas

[57] ABSTRACT

A power window apparatus for carrying out a safety control operation when an object is caught in the window, which apparatus is capable of setting a safety control mode disabling region to within the required distance exactly. The power window apparatus includes a motor rotation sensor for sensing a state of rotation of the motor, and a window movement sensor for sensing the amount of movement of the window. The object-caught state is detected on the basis of the rotational rate of the motor, and the absolute position of the window is detected on the basis of the detected amount of movement of the window. The safety control mode is disabled in response to the detected absolute position of the window. A reference value for detecting the object-caught state may be varied as the window approaches its fully closed position.

14 Claims, 12 Drawing Sheets

RESISTOR MEMBER

EFFECTIVE STROKE

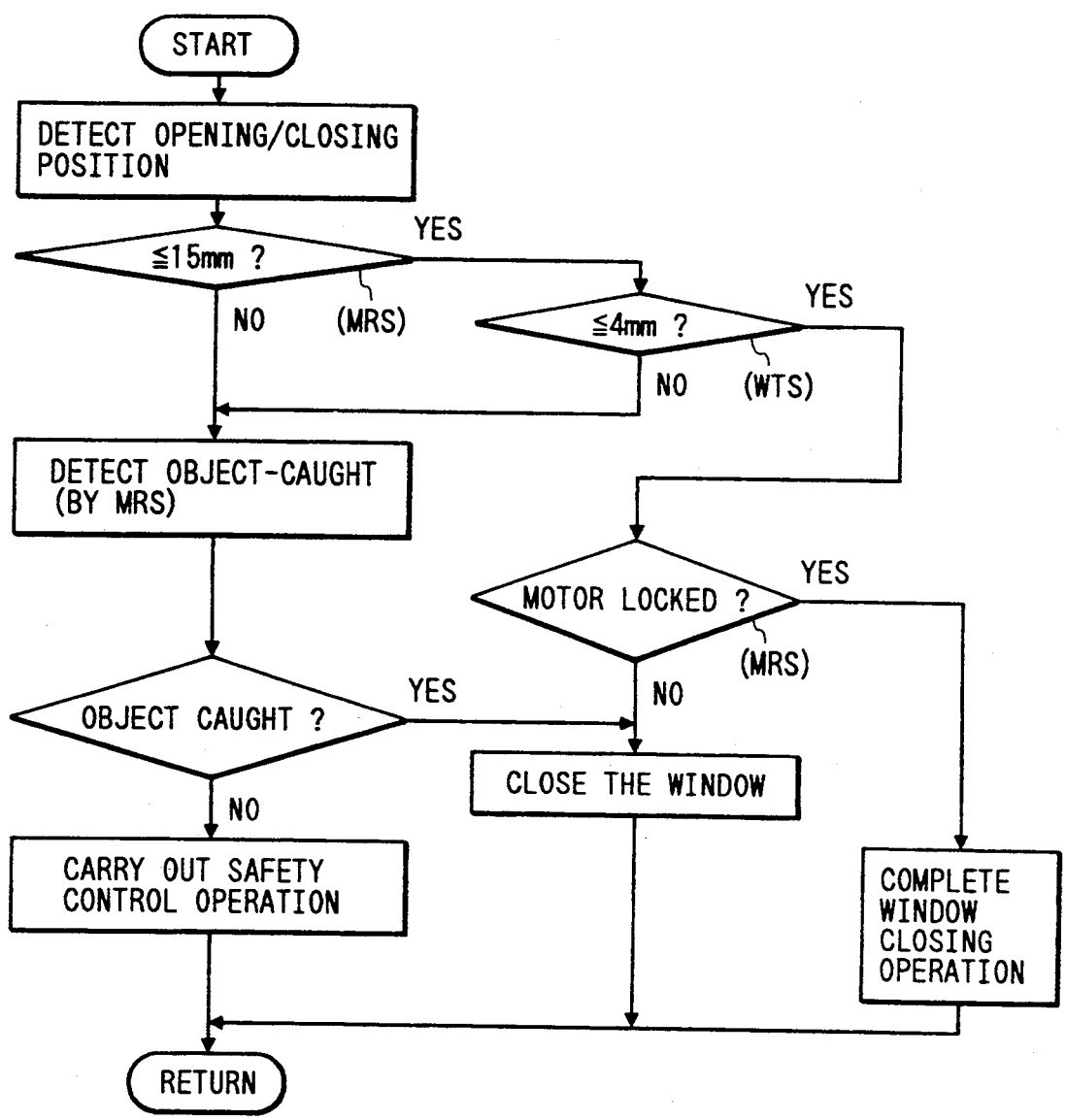

POWER WINDOW APPARATUS WITH SAFETY DEVICE

BACKGROUND OF THE INVENTION

The present invention relates to a power window apparatus, for use with a motor vehicle, for driving a window glass for opening and closing the window with a motor, for example. More particularly, the invention relates to a power window apparatus with a safety device which performs a safety control operation when the hand, neck, etc., of a driver or passenger is interposed between the window glass and the sash.

Generally, a power window apparatus is constructed so as to drive the window glass for opening and closing purposes with a drive source, for example, an electric motor. In the power window apparatus of this type, the window glass is automatically moved for opening and closing by the drive source.

In such a power window apparatus, to cope with the situation where the hand or neck of a passenger is accidentally interposed between the window and the sash, a safety device is provided. The safety device operates such that, when it detects a state where an object is interposed between the window glass and the sash, movement of the window glass is stopped, or the window glass is forcibly moved in the opening direction.

To detect the state where an object is caught in the window, the safety device measures the rotational speed of the motor, which is proportional to the opening and closing speed of the window glass, since when the load on the motor for moving the window glass increases, the motor speed decreases. Specifically, the safety device detects when the motor speed drops below a preset value, i.e., a state which corresponds to a load indicative of the hand, neck, etc., of the driver or passenger being caught in the window.

When the window is fully closed to hit the sash, its speed is reduced to zero. The conventional detecting system mentioned above sometimes mistakenly recognizes this speed reduction as an object-caught state. As a result, the safety control operation starts to fully open the window, and the window is left open.

To avoid the window being left open, the current position of the window can be constantly monitored utilizing the quantity of rotation of the motor. When the window approaches the position where it is fully closed, the safety control mode is disabled, allowing the window to be fully closed. That is, a safety control mode disabling region is provided. The safety control mode disabling region must cover a very small distance in order to prevent fingers of children from being caught in the window. For this purpose, the position for safety control mode disabling is typically set at a position approximately 4 mm short of the position where the window is completely closed.

Further, in the above-described detecting method, if the reference value of the object-caught detector is set at a critical value, the following problem arises. In a region just before the window is completely closed and the window glass is in contact with the weather strip of the sash, the frictional resistance between the window glass and the weather strip impedes the rotation of the motor to reduce the motor speed. The object-caught detector can mistakenly recognize this state as that in which an object is caught in the window. As a result, the closing operation of the window is stopped, so that the window is incompletely closed.

In a window using the weather strip WS having the structure in cross section as shown in FIG. 15, the upper edge of the window glass 207 comes into contact with the lip WL of the weather strip WS at a position approximately 15 mm short of the position where the window is completely closed. In the region where the window glass comes in contact with the lip (referred to as a run channel region), the closing operation of the window is impeded, so that the motor speed decreases. In this state, erroneous detection tends to occur. To avoid such erroneous detection, the reference value for the object-caught detection must have some range of variation in value. However, if the reference value is so set, the sensitivity of the object-caught detector when it detects an object being caught in the channel region is reduced. Accordingly, it is difficult for the object-caught detector to detect a state, for example, where a finger is caught in the window. In the figure, SS designates a sash.

The actual power window apparatus employs a gear mechanism, wire, and pulley mechanism for transferring the rotational force of the motor to the window glass. Accordingly, the power window apparatus inevitably suffers from problems such as variations in the rotational amount of the motor owing to the damper effect caused by the presence of the gear mechanism, stretching of the wire, wear of the pulleys, and the like. As a result, a precise relationship between the number of revolutions of the motor and the position of the window cannot be maintained over time, thus making it difficult to accurately control the safety mode disabling region to within that distance.

Thus, the conventional power window apparatus with a safety device cannot simultaneously satisfy both contradictory requirements of detecting an object being caught with a high sensitivity particularly in the run channel region and preventing erroneous operations when the safety control operation is carried out and the window is completely closed.

SUMMARY OF THE INVENTION

Accordingly, an object of the present invention is to provide a power window apparatus with a safety device which can maintain the safety control mode disabling region to within the required distance exactly.

Another object of the present invention is to provide a power window apparatus witch a safety device which is able to detect the positions of the opening/closing windows at a high sensitivity, and to prevent erroneous operations when a safety control operation is carried out and the window is completely closed.

In accordance with the above and other objects, the invention provides a power window apparatus with a safety device comprising means for detecting a state of rotation of the motor, and means for detecting the quantity of movement of the window, wherein an object-caught state and the current position of the window are detected on the basis of the rotational state of the window, and the absolute position of the window is detected on the basis of the detected quantity of movement of the window. The safety control operation is carried out on the basis of these detection results.

Yet further in accordance with the above objects, the invention provides a power window apparatus with a safety device including means for detecting a object-caught state by comparing the speed of the motor with a reference value, means for detecting the position of the opening or closing window in a region just before the window is completely closed, and means for setting a reference value to detect the object-caught depending on the detected position of the opening/closing window.

The means for detecting the position of the opening/closing window includes a position sensor for detecting the amount of movement of the window glass. The position sensor includes a sensor portion which moves together with the window glass in a state Wherein the sensor portion is in contact with the window glass or a part of the window glass, a reducing portion for reducing the movement quantity of the sensor portion, a signal generating portion for producing the reduced movement quantity in the form of an electrical displacement, and a casing for sealing at least the signal generating portion tightly against liquid.

BRIEF DESCRIPTION OF THE DRAWINGS

FIG. 7 is a flowchart showing the operation of the power window apparatus according to the second embodiment;

DESCRIPTION OF THE PREFERRED EMBODIMENTS

Preferred embodiments present invention now will be described with reference to the accompanying drawings.

Figure 2:
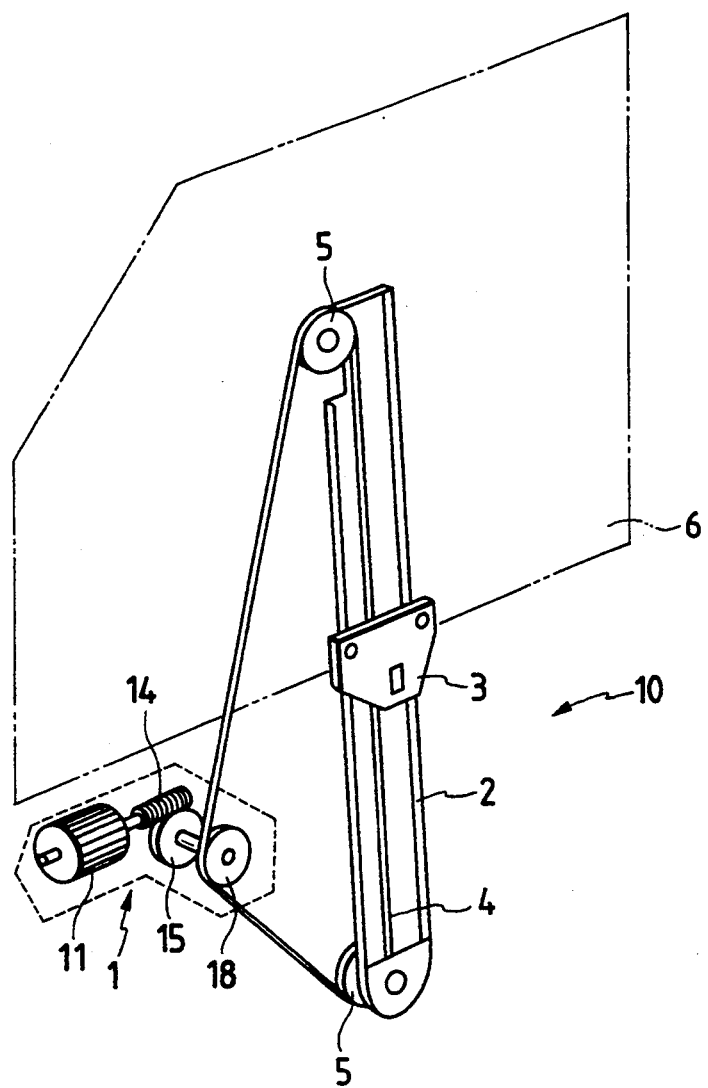
FIG. 2 is a view schematically showing a power window apparatus in which the present invention is incorporated.

FIG. 2 is an exploded schematic illustration showing a power window apparatus to which the present invention is incorporated. As shown in this drawing, a window opening/closing mechanism 10 is installed in a portion of the body of an automobile or a car located under the window. In the window opening/closing mechanism 10, a rail 2 extends vertically. A slider 3 is vertically slidable along the rail 2. A wire 4 is connected to the slider 3. The wire 4 is wound around pulleys 5 mounted at the top and bottom of the rail 2, and connected to a window drive section 1. When the motor 11 of the window drive section 1 is driven, the slider 3 is moved up and down by the wire 4. A window glass 7 is mounted on the slider 3. The window glass 7, when it is moved up and down together with the slider 3, closes and opens the window space defined by the sash.

Figure 1:
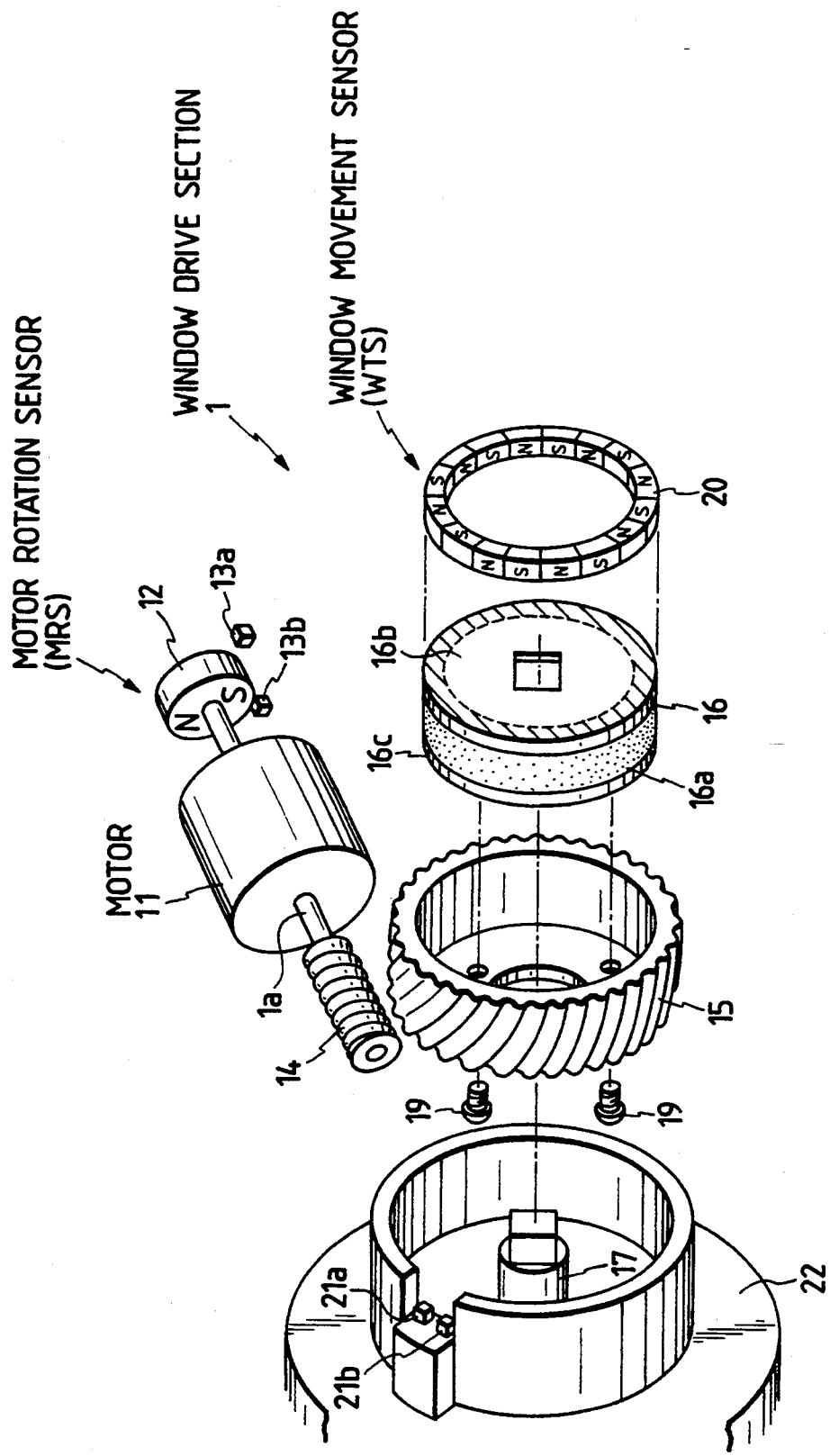
FIG. 1 is an exploded view showing a part of a power window apparatus constructed according to a preferred embodiment the present invention.

The structure of a key portion of the window drive section 1 is illustrated in FIG. 1. In this figure, reference numeral 11 designates an electric motor employed as a drive source. A disc-like magnet 12, polarized as shown, is mounted on a part of the rotating shaft 1a of the motor 11. A pair of Hall elements 13a and 13b, which are disposed on both sides of the magnet 12, are angularly spaced apart from each other by 90° with respect to the axis of the magnet 12. The magnet 12 and the Hall elements 13A and 13b together form a motor rotation sensor MRS. A worm gear 14 is mounted on the other end part of the rotating shaft 1a. The worm gear 14 is in mesh with a worm wheel 15. The worm wheel 15, which has a damper 16 fitted thereinto, is fixedly coupled to an output pulley shaft 17 to transfer the rotational force of the worm wheel 15 through the output pulley shaft 17 to the drive pulley 18 in FIG. 2. Thus, the wire 4 is moved.

Metal plates 16b and 16c of the damper 16 are bonded to respective sides of a disc-like rubber plate 16a. A metal plate 16c is fastened to the worm wheel 15 by means of screws 19. The damper 16 absorbs an impact generated between the metal plates 16b and 16c, i.e., between the motor side and the window glass side, by the elastic deformation of the rubber plate 16a. A ring-like multi-pole magnet 20, circumferentially magnetized as shown, is fastened to the surface of the metal plate 16b coupled with the output pulley shaft 17, which is located closer to the window glass. A pair of Hall elements 21a spaced by half an NS magnet element are disposed around the ring magnet 20. The ring magnet 20 and the pair of Hall elements 21a together form a window movement sensor WTS for sensing the quantity of rotation of the output pulley shaft 17, the quantity of the movement of the wire 4 connected thereto, or the quantity of the movement of the window glass 6.

Reference numeral 22 designates the housing of the window drive section 1. Reference numeral 20 designates the housing of the window opening/closing mechanism 1.

Figure 3:
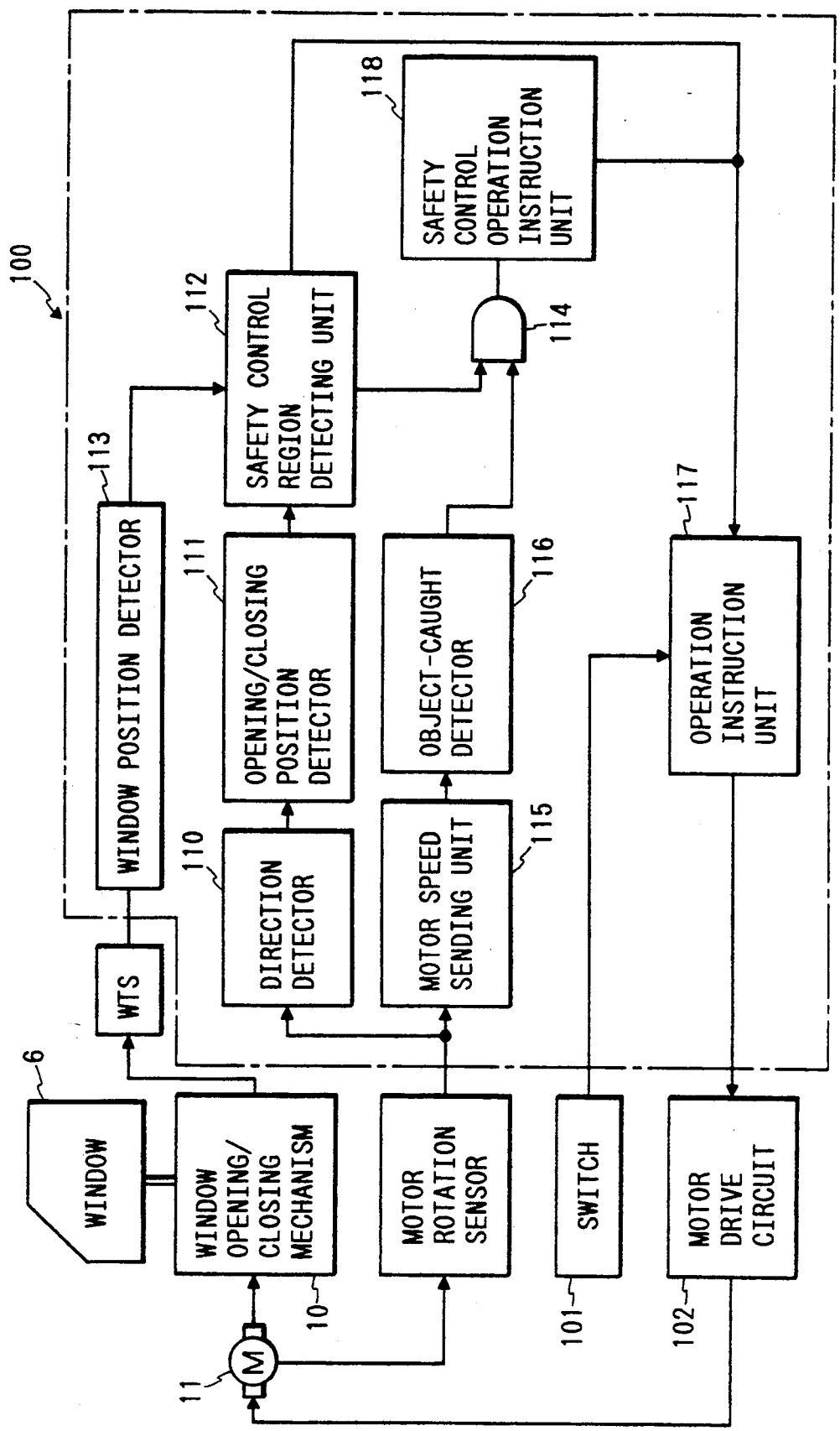
FIG. 3 s a block diagram showing an electrical system including a motor rotation sensor (MRS) and a window transfer

FIG. 3 is a block diagram showing an electrical system including the motor rotation sensor MRS and the window movement sensor WTS in the power window apparatus. In this figure, a microcomputer 100 receives pulse signals from the motor rotation sensor MRS for sensing the amount of rotation of the motor 11. The opening/closing operation of the window is selected by a function switch 101. The select signal from the switch 101 is also applied to the microcomputer 100. The switch 101 is used for opening or closing the window in an automatic mode or a manual mode. A motor drive circuit 102 controls the motor 11 in accordance with a signal from the microcomputer 100.

The microcomputer 100 includes a system for detecting a safety control region from the opening/closing operation of the window, and another system for detecting a state where an object is caught in the window.

The system for detecting the safety control region includes a window moving direction detector 110 which detects the repetition rate of pulse signals output from the motor rotation sensor MRS, the rotational direction of the motor, and the opening or closing direction of the window. A detector 111 for detecting the opening/closing position includes an up/down counter in this embodiments. The counter is set to 0 when the window is completely closed. When the motor forwardly rotates, the counter counts pulse signals produced therefrom in the negative direction. When the motor reversely rotates, the counter counts pulse signals in the positive direction. The current position of the opening or closing window is detected in the form of the count of the counter. In response to the output signal of the opening/closing position detector 111, a safety control region detector 112 detects a safety control region which excludes a safety control mode disabling region within a preset range near the position where the window is completely closed. The safety control operation is allowed within only the safety control region.

The signal from the window movement sensor WTS of the opening/closing mechanism 10 is applied to a window position detector 113 for detecting the absolute position of the window. The position of the opening or closing window in the region near the position where the window is completely closed is accurately detected by the window position detector 113. The output signal from the detector 113 is input to the safety control region recognizing unit 112, which detects the safety control region and sets a reference value for object-caught detection.

In the operation for detecting the safety control region, the output signal of the safety control region recognizing unit 112 is input to a first input terminal of an AND gate 114, and is also applied to an operation instruction unit 117. The operation instruction unit 117 outputs to the motor drive circuit 102 an operation instruction which depends on the state of the switch.

The system for detecting a state where an object is caught in the window includes a motor speed sensor 115 for detecting the speed of the motor by sensing the time intervals of the signals from the motor rotation sensor MRS, and an object-caught detector 116 for detecting the object-caught state by sensing a reduction of the motor speed. The speed reduction is detected by comparing the sensed speed and the reference value. The output signal of the object-caught detector 116 is input to the other input terminal of the AND gate 114. The output signal of the AND gate 114 is input to the safety control operation instruction unit 118. Upon receipt of the object-caught signal, the safety control operation instruction unit 118 controls the operation instruction unit 117 for effecting a safety control operation. For safety control, the window glass is moved 12 cm from the current position of the window glass in the opening direction.

In the power window apparatus thus constructed, when the motor 11 starts to operate, the motor rotation sensor MRS sends pulse signals to the microcomputer 100. The motor speed sensor 115 detects the motor speed according to the time intervals of the pulse signals. When the motor speed is below the reference speed, the object-caught detector 115 outputs an object-caught signal. Either the absolute speed or the relative speed can be used for the motor speed.

The direction detector 110 detects the direction of rotation of the motor 11, i.e., the opening or closing direction of the window, using the pulse signals from the motor rotation sensor MRS. As the motor shaft turns, the paired Hall elements 13A and 13b produce pulse signals shifted by ¼ period with respect to one another, with the direction of the shift being determined by the direction of motor rotation. The direction of the motor rotation thus can be detected from the phase difference of the pulse signals. In the opening/closing position detector 111, the counter contained therein counts up or down according to the direction of motor rotation and the amount of the motor rotation. The resultant count is indicative of the present position of the window. The safety control region recognizing unit 112 determines whether or not the window is within the safety control region on the basis of the output signal of the opening/closing position detector 111. If it is within the safety control region, it applies an output signal to the AND gate 114.

In detecting the safety control region, the window position detector 113 accurately detects the position of the window near the position where the window is fully closed, and applies the detected position to the safety control region recognizing unit 112. Accordingly, the safety control region can be exactly recognized. In the window position detector 113, the pulse signals from the window movement sensor WTS are counted by the counter as in the opening/closing position detector 111. The count of the counter provides the absolute position of the window.

The object-caught detection signal is input to the AND gate 114. At the same time, the signal from the safety control region recognizing unit 112 is applied to the AND gate 114. Since the gate is enabled by the signal from the safety control region recognizing unit 112, the object-caught detect signal is passed to the safety control operation instruction unit 118. The unit 118 operates the operation instruction unit 117, whereby the safety control operation is carried out. In the safety control operation, the operation instruction unit 117 inverts the polarity of the current applied to the motor 11 by the motor drive circuit 102. Then, the motor is reversely turned to open the window glass a preset distance of, for example, 12 cm, and then is stopped. As a result, the object is released from its state of being caught in the window. Thus, safety is secured.

In the window movement sensor WTS, the ring magnet 20 is of the multi-pole type. Accordingly, it produces a pulse signal whose frequency is higher than that of the signal from the motor rotation sensor MRS, if its speed is reduced by the worm mechanism. By using the pulse signal of the higher frequency, the window position detector 113 accurately detects the quantity of motor rotation after passing the damper 16, that is, the quantity of movement of the window glass 6, which is moved by the wire 4 wound around the drive pulley 18. Accordingly, in the safety,control region recognizing unit 112, the safety control mode removal region can be controlled precisely.

The window movement sensor WTS detects the amount of motor rotation after the rotating force from the motor 11 passes the damper 16. Accordingly, if the direction or amount of rotation of the damper 16 is changed, the detected quantity of the movement of the window nevertheless does not contain any error. Thus, the absolute position of the window can be detected with high precision.

Figure 4A:
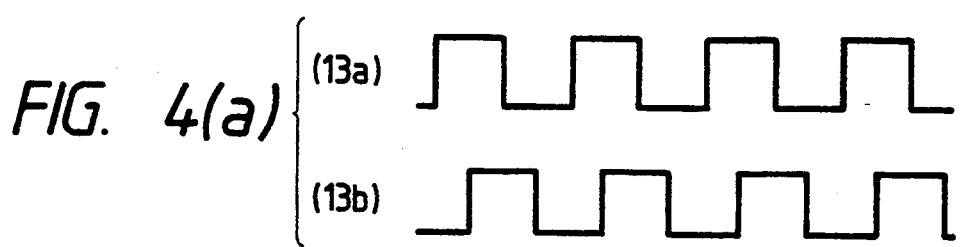
FIGS. 4(a) and 4(b) show sets of waveforms of signals output from a motor speed Sensor and a window movement sensor.
Figure 4B:
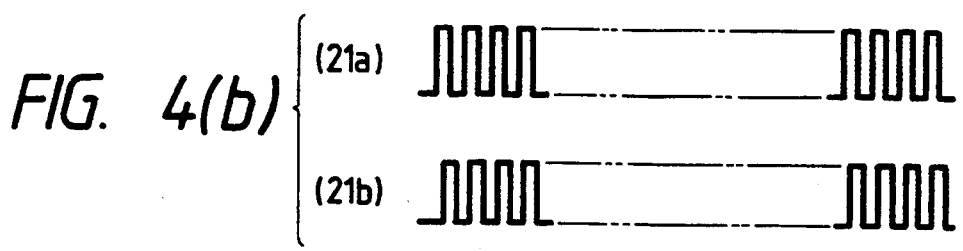

Sets of waveforms of signals output from a motor speed sensor and a window movement sensor are illustrated in FIGS. 4(a) and 4(b). The waveforms of the signals output from the motor rotation sensor MRS are shown in FIG. 4(a). The waveforms of the signals output from the window movement sensor WTS are shown in FIG. 4(b). Reference numerals in FIGS. 4(a) and 4(b) correspond to those of the Hall elements.

Figure 5:
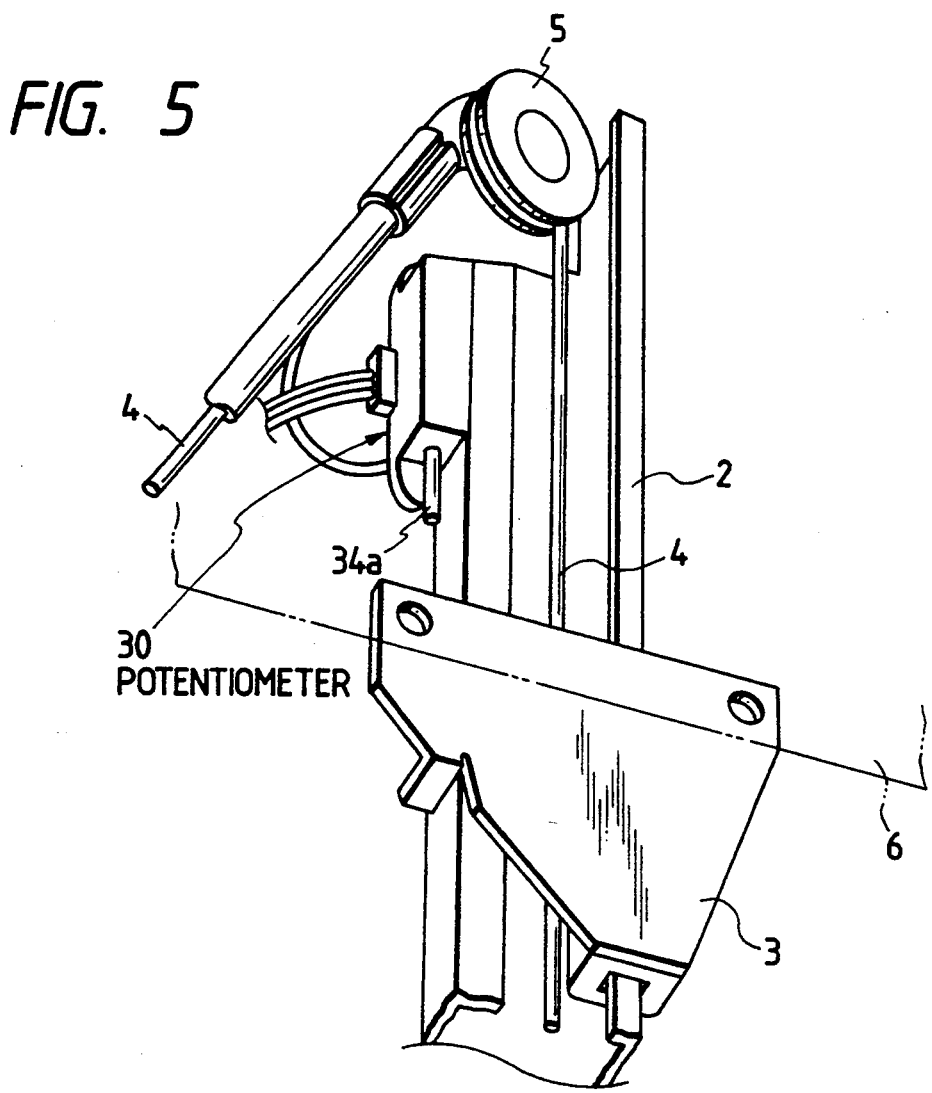
FIG. 5 is a perspective view showing a key portion of a power window apparatus according to a second embodiment of the present invention.

FIG. 5 is a perspective view showing a key portion of a power window apparatus according to a second embodiment of the present invention. In this embodiment, a potentiometer is used instead of the window movement sensor. The motor rotation sensor is the same as that in the first embodiment. In the figure, a potentiometer 30 is attached to one side of the rail 2 of the power window apparatus. When the window approaches the position where the window is fully closed, the slider 3 operates the potentiometer 30.

Figure 6A:
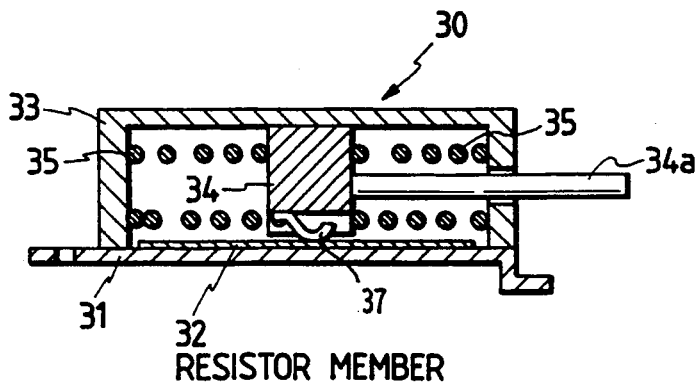
FIGS. 6(a), 6(b) and 6(c) are respectively show diagrams showing the internal structure of a potentiometer, its electrical characteristic, and the variation of the output voltage corresponding to the positions of the window as it is moved.

In the potentiometer 30, as shown in FIG. 6(a), a resistor member 32 is mounted on a substrate 31. An actuator 34, which is slidably mounted within a casing 33 covering the substrate 31, is resiliently held in a state where it is urged in one direction by a pair of springs 35. An operating rod 34a protruding from the actuator 34 projects through a hole of the casing 33 to abut the slider 3. The actuator 34 includes a contacts 37, which slides on the surface of the resistor member 32. The output of the potentiometer 30, which is in the form of a resistance, is indicative of the amount of movement of the actuator 34. The variation characteristics of the quantity of movement and the resistance are linear.

Also in the second embodiment, an object-caught state is detected using the signal output from the motor rotation sensor MRS as in the first embodiment. The absolute position of the window is detected in the following manner. When the window is moved up to a position where the window is fully closed, the slider 3, which is fixedly coupled to the window glass 6, hits the operating rod 34a of the potentiometer 30 to turn the actuator 34. As a result, the resistance value output at the contact 37 changes. Using this resistance value, the absolute position of the wind glass, i.e., the window opening/closing position, is detected.

Figure 6B:
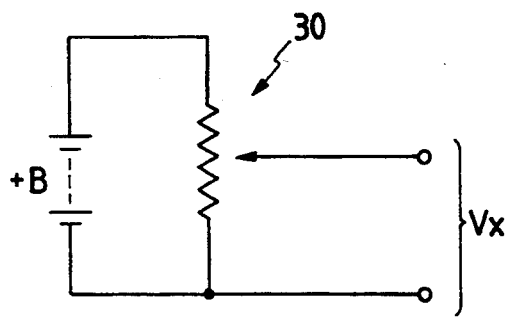
Figure 6C:
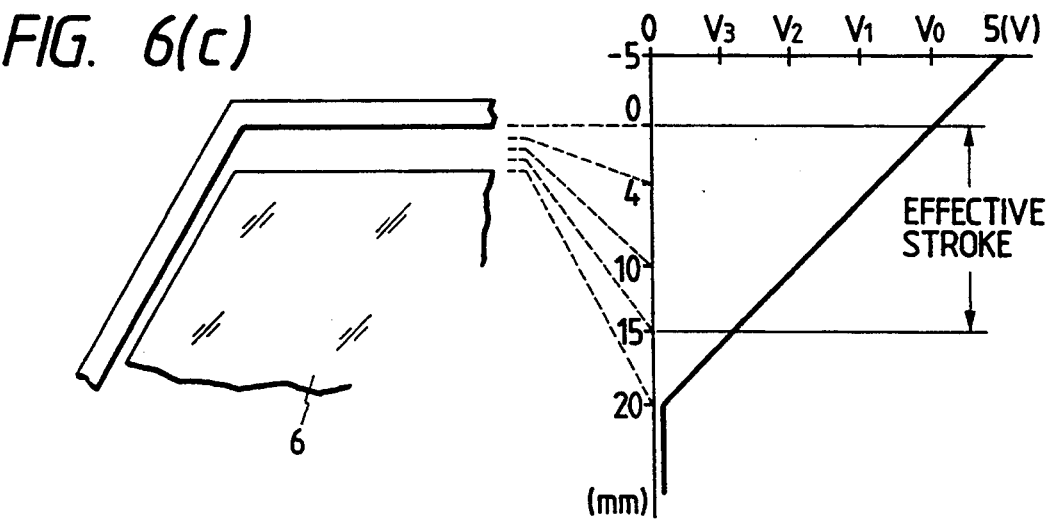

The potentiometer 30 is electrically constructed as shown in FIG. 6(b). As shown, the potentiometer 30 and a power source +B are connected in a closed circuit. A voltage drop $V_x$ across the potentiometer is measured. The output characteristic of the potentiometer is as shown in FIG. 6(c). In the case where the potentiometer 30 has a full stroke of 25 mm, the two end parts are blocked 5 mm from the ends to provide an effective stroke of 15 mm. One end of the effective stroke is made to correspond to the fully closed position of the window. The positions of the window within the range of 15 mm toward the window opening direction are detected precisely. If the voltage generated when the window is fully closed is selected as the reference value $V_0$, the window opening/closing absolute position can be detected as the voltage difference between the reference value $V_0$ and the detected voltage $V_x$. The potentiometer 30 continuously detects a change of the window opening/closing position and continuously outputs a voltage. Accordingly, the voltage can be measured precisely. The resultant detection precision is higher than that in the detecting method using the signals from the Hall elements. Even a distance as small as about 4 mm can be detected. Thus, high precision control of the safety control mode disabling region is realized.

The operation of the power window apparatus including safety control, which uses the motor rotation sensor MRS and the window movement sensor WTS, is as shown in FIG. 7.

As described above, the distortions in the rotation of the damper will not cause error in the window opening/closing position, as in the first embodiment. The amount of movement of the window glass is directly detected, so that the result does not involve the wire 4, the pulleys 5, and the like. Because of this, the power window apparatus is free from detection error of the window opening/closing position and the window movement quantity due to stretching of the wire 4, slippage of the wire on the pulleys 5, and the like. Accordingly, the position control is more accurate than that in the first embodiment.

High precision control is not required for the window opening/closing position outside the effective stroke of the potentiometer 30. Accordingly, the output signal of the motor rotation sensor MRS is used. The use of the output signal is applied to the position detection spaced 15 mm or more from the fully-closed position of the window.

As seen from the foregoing description, a detector for sensing the amount of window movement is provided in addition to the detector for sensing the state of motor rotation employed to move the window. The opening/closing position of the window is detected according to the quantity of window movement. The power window apparatus can thus detect the window opening/closing position close to the fully closed position of the window highly precisely, and control the safety control mode removal region can be precisely effected. Therefore, the power window apparatus of the invention has a good safety performance.

Figure 8:
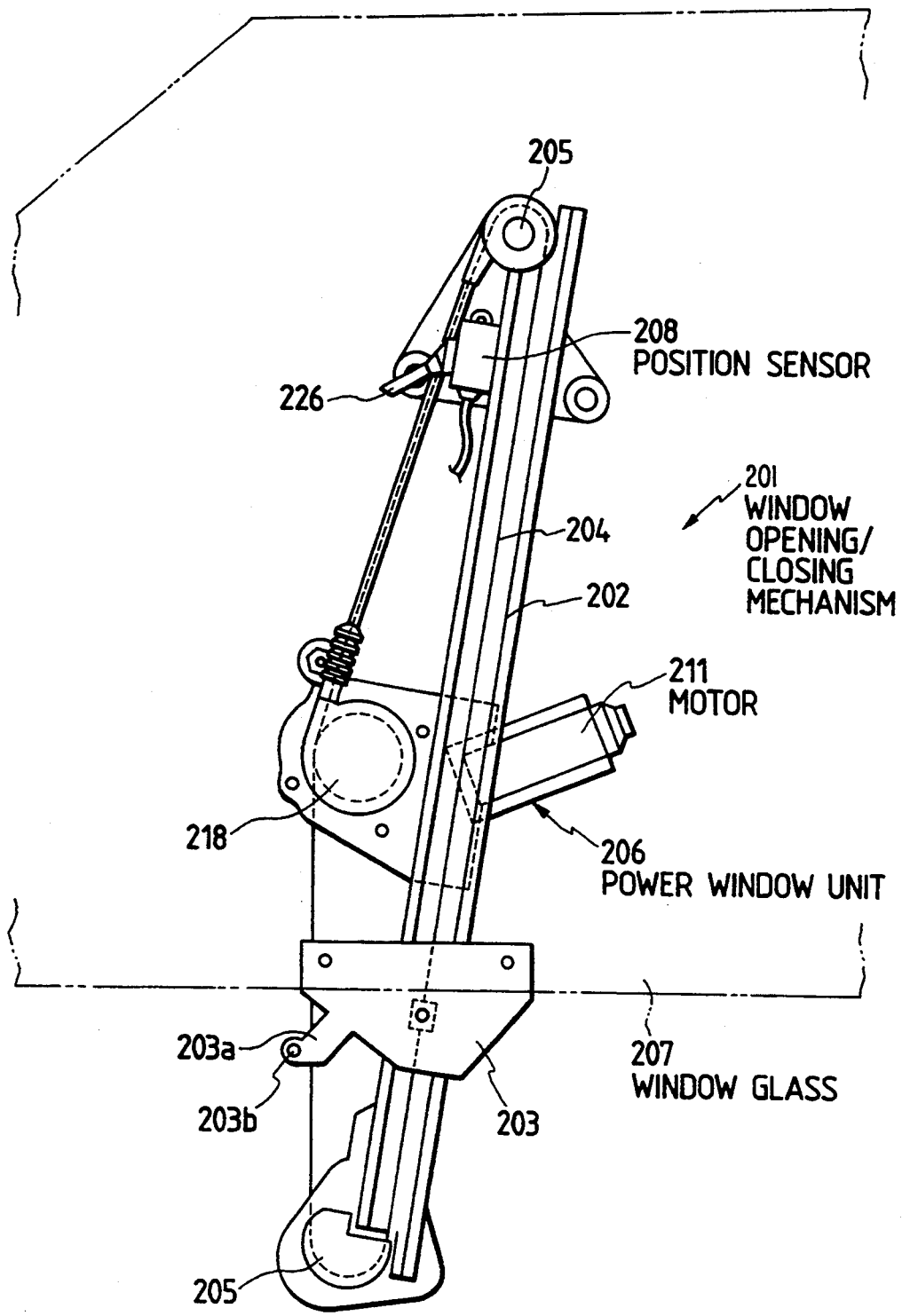
FIG. 8 is a side view showing the overall construction of a power window apparatus according to a further embodiment of the present invention.

Further embodiments of the present invention will be described with reference to the accompanying drawings. FIG. 8 is a side view showing the overall construction of a power window apparatus according to an embodiment of the present invention. As shown, a window opening/closing mechanism 201 is installed in a portion of the body of an automobile located under the window. In the window opening/closing mechanism 201, a rail 202 extends vertically. A slider 203, coupled with the rail, is vertically slidable along the rail 202. A wire 204 is connected to the slider 203. The wire 204 is wound around pulleys 205 mounted at the top and bottom of the rail 202, and further around a pulley of a power window unit 206. The window opening/closing mechanism 201 includes a motor 211 for driving the pulleys, as will be described later. When the motor 211 is driven, the drive pulley 218 is turned to move the wire 204, and hence to vertically move the slider 203. The window glass 207 is mounted on the slider 203. The window glass 207, when it is moved up and down together with the slider 203, closes and opens the window space, defined by the sash.

A position sensor 208, which will be described in detail later, is fastened to the upper portion of the rail 202. The position sensor 208 is used for detecting the current position of the slider 203, i.e., the current position of the closing and opening window.

Figure 9:
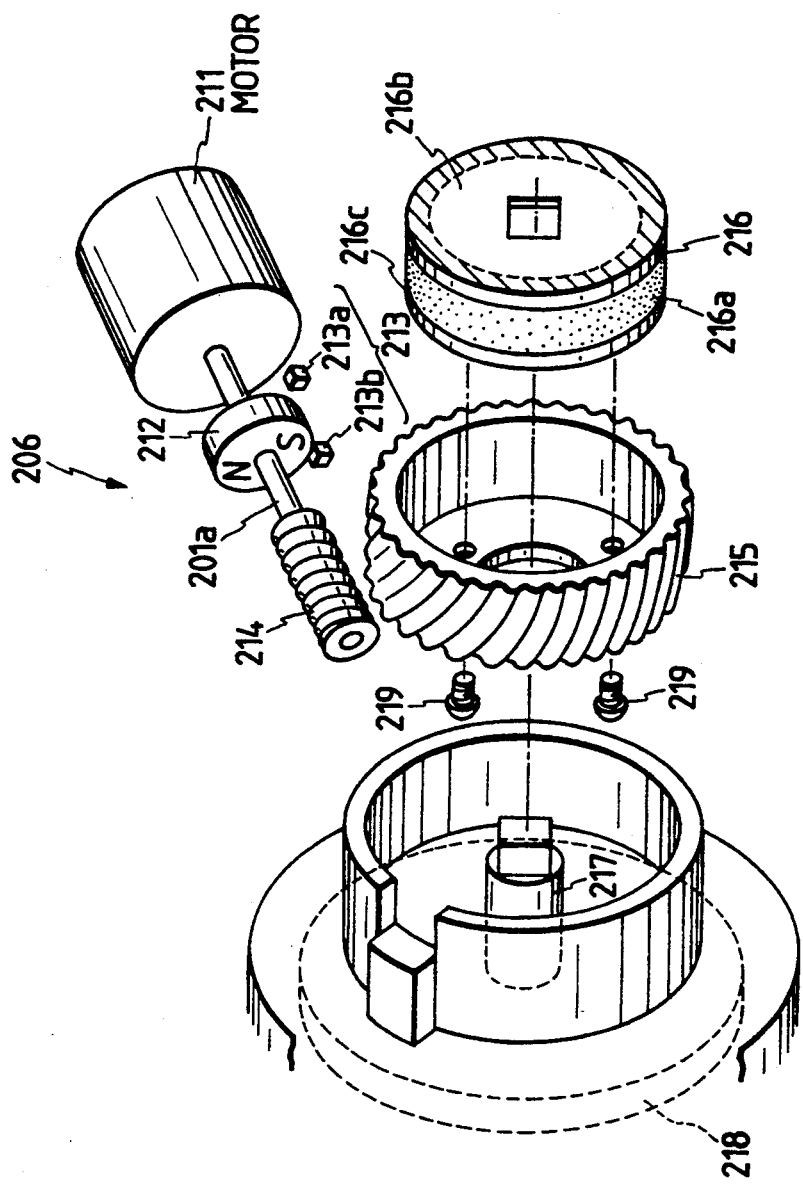
FIG. 9 is an exploded view showing a part of a power window drive section.

The structure of a key portion of the power window unit 206 is illustrated in FIG. 9. In the figure, reference numeral 211 designates an electric motor used as a drive source. A disc-like magnet 212, polarized as shown, is mounted on a part of the rotating shaft 201a of the motor 211. A pair of Hall elements 213a and 213b, which are disposed on both sides of the magnet 212, are spaced angularly apart from one another by 90° with respect to the axis of the magnet 212. The magnet 212, and the Hall elements 213a and 213b together form a speed sensor 213. In the speed sensor 213, when the magnet 212 is rotated together with the rotating shaft 201a, the Hall elements 213a and 213b produce pulse signals having different phases.

A worm gear 214 is mounted on the distal end part of the rotating shaft 201a. The worm 214 is in mesh with a worm wheel 215. The worm wheel 215, which has a damper 216 fitted thereinto, is fixedly coupled to an output pulley shaft 217 so as to transfer the rotational force of the worm wheel 215 through the output pulley shaft 217 to the drive pulley 218 to move the wire 204.

Metal plates 216b and 216c are bonded to respective sides of a disc-like rubber plate 216a. A metal plate 216c is fastened to the worm wheel 215 by means of screws 219. The damper 216 absorbs an impact generated between the metal plates 216b and 216c, that is, between the motor side and the window glass side, by making use Of elastic deformation of the rubber plate 216a.

Reference numeral 220 designates the housing of the window opening/closing mechanism 201.

Figure 10:
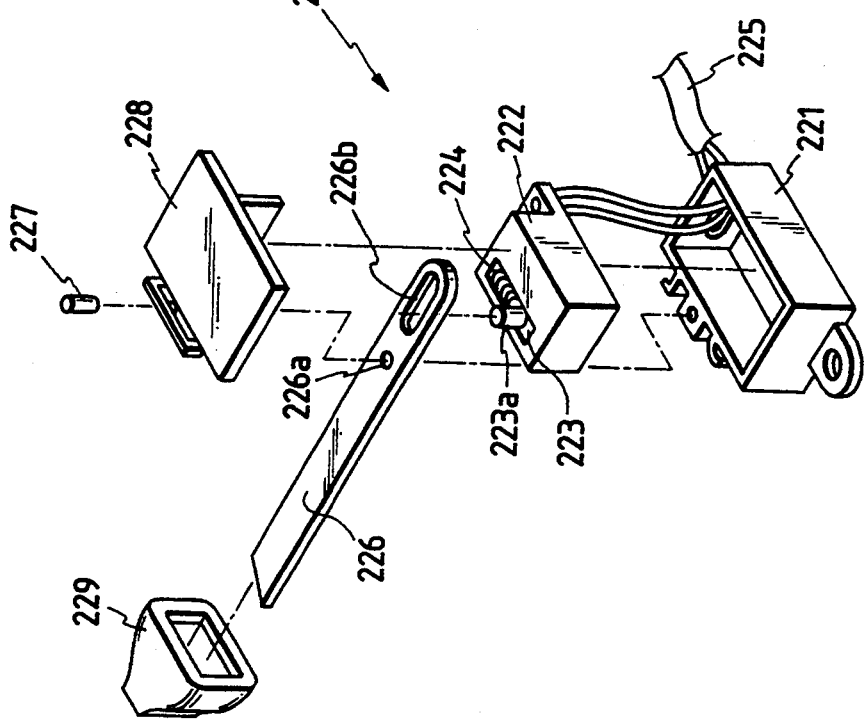
FIG. 10 is an exploded view showing a part of a position sensor used in the power Window apparatus.

An exploded view showing a part of the position sensor 208 is illustrated in FIG. 10. The potentiometer 222 is attached to the inside of a case 221, of which the upper side is opened. The potentiometer 222, although not described in detail, is constructed such as that a conductive piece is linearly moved along a plate-like resistor member in a reciprocating manner, it exhibits a resistance value which changes according to the position of the sliding conductive piece. The conductive piece, which is fastened to a moving rod 223, is urged in one direction by means of a spring 224. A harness 225, which is connected to the potentiometer 222, is led out of the case 221 through a hole of the case.

A sensing lever 226 is rotatively mounted, by a pin 227 inserted through a hole 226a of the lever, to the case 221 containing the potentiometer 222 therein. Specifically, the sensing lever 226 is horizontally turned about the pin 227. An elongated hole 226b is formed in the base part of the sensing lever 226. A protruding rod 223a of the moving member 223 of the potentiometer 222 is inserted into the elongated hole 226b. The sensing lever 226 having the base part extends outwardly from the case. A cover 228 is applied to the upper side of the case, which is otherwise open, to seal the case so as to prevent entrance of liquid, thereby forming a casing. Thus, the potentiometer 222 is thus protected from entry of liquids. A boot 229 is applied to the distal end of the sensing lever 226.

Figure 11:
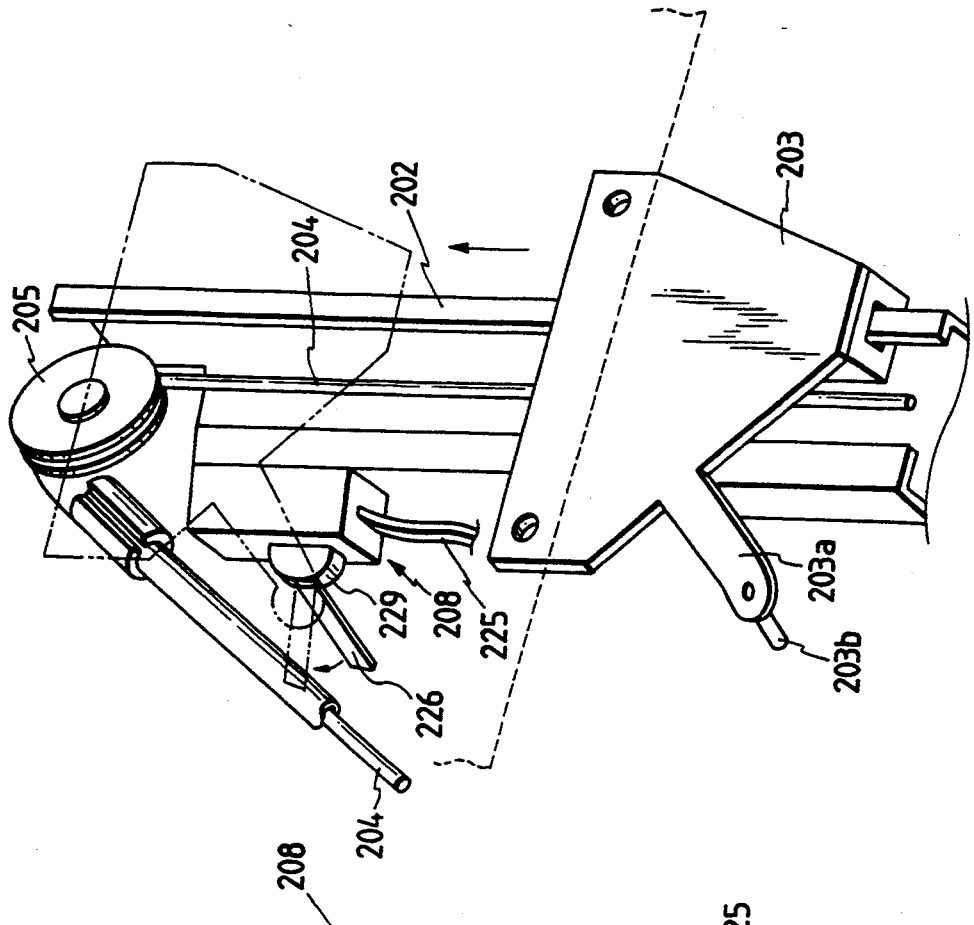
FIG. 11 is an enlarged perspective view showing a part of the power window apparatus.

As shown in FIG. 11 showing an enlarged perspective view showing a part of the power window apparatus, the position sensor 208 is mounted such that a part of the casing is mounted in the upper part of the rail 202 by means of screws, and the distal end of the sensing lever 226 is directed toward the moving path of the slider 203. Accordingly, if the slider 203 is moved along the rail 202 and approaches a position where the window is completely closed, as indicated by a two-dot chain line in the figure, the pin 203b fixed to the protruded part 203a of the slider 203 comes in contact with the distal end of the sensing lever 226 to push and turn the sensing lever 226 in the direction of an arrow. The swing of the sensing lever 226 is transferred to the elongated hole 226b of the base part of the lever, so that the stroke of the potentiometer is reduced in accordance with the ratio of the length of the lever from the pin to the distal end and the length from the pin to the base end. As a results, the moving member 223 of the potentiometer 222 is moved. With the movement of the moving member 223, the conductive piece is moved along the resistor member to change its resistance. The output voltage, which depends on the change of the resistance, is output as a position output signal.

Figure 12:
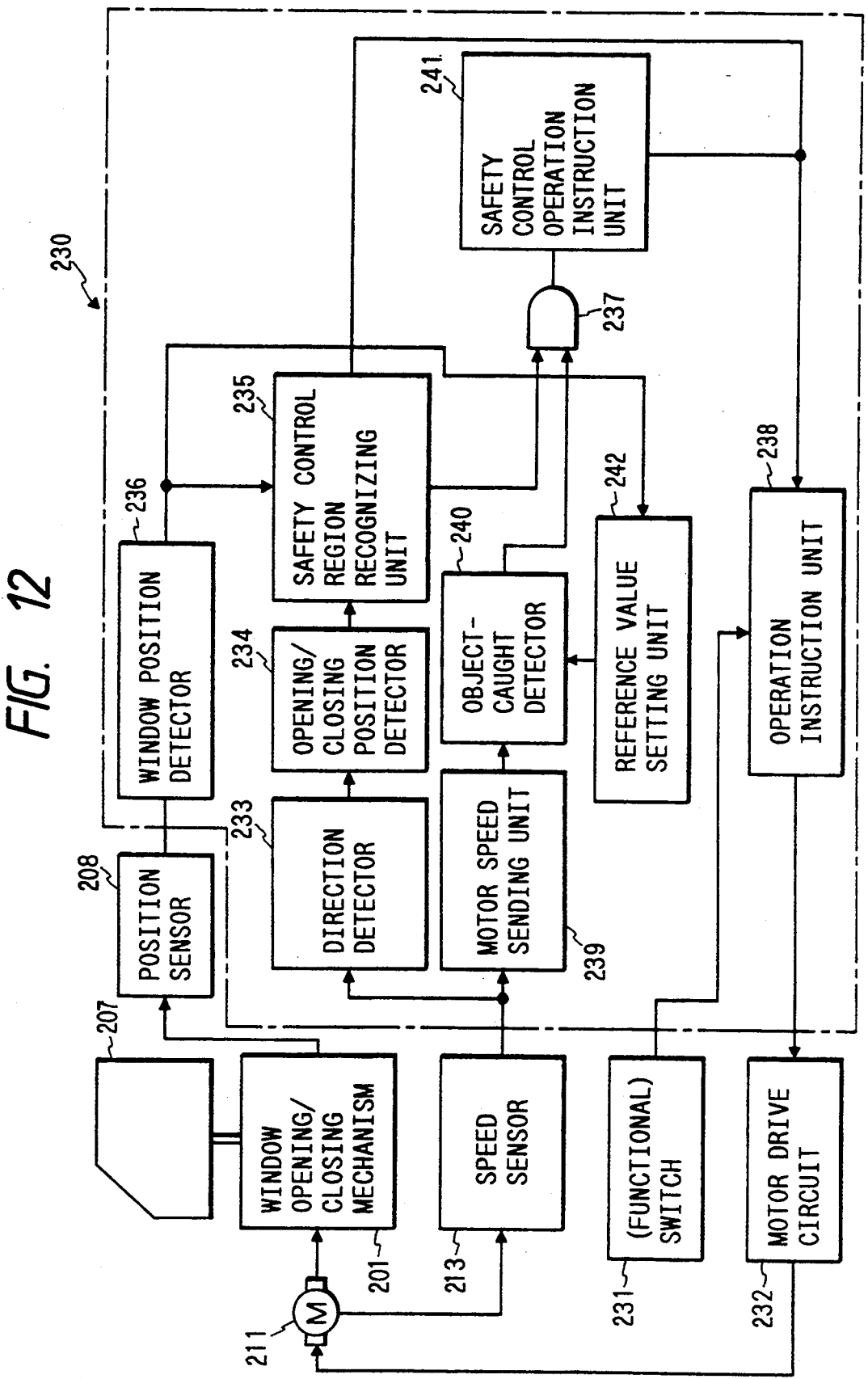
FIG. 12 is a block diagram showing an electrical system used in the power window apparatus.
Figure 13:
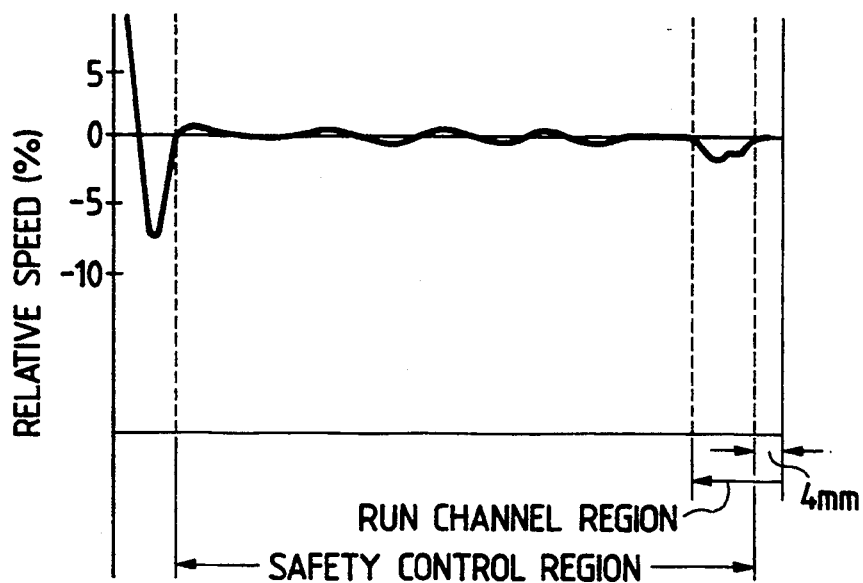
FIG. 13 is a graph showing the relationship of the motor speed and a detection reference value.

FIG. 12 is a block diagram showing an electrical system (including the position sensor) used in the power window apparatus. In the figure, a microcomputer 230 receives pulse signals derived from the speed sensor 213 for detecting the number of revolutions or Speed of the motor 211 as a drive source for the power window. It also receives a position detect signal from the position sensor 208. The opening/closing of the window is selected with a manually operated function switch 231. The select signal from the switch 231 is also applied to the microcomputer 230. The switch 231 is used for selectively opening or closing the window in an automatic mode or a manual mode. A motor drive circuit 232 controls the motor 211 in accordance with a signal from the microcomputer 230.

The microcomputer 230 includes a system for detecting a safety control region from the opening/closing operation of the window, and another system for detecting a state where an object is caught in the window.

The system for detecting the safety control region includes a window moving direction detector 233 which detects the repetition rate of pulse signals output from the speed sensor 213, the rotational direction of the motor, and the opening or closing direction of the window. A detector 234 for detecting the opening/closing position includes an up/down counter. The counter is set to 0 when the window is completely closed. When the motor forwardly rotates, the counter counts pulse signals produced therefrom in the negative direction. When the motor reversely rotates, the counter counts pulse signals in the positive direction. The current position of the opening or closing window is detected in the form of the count of the counter. A safety control region recognizing unit 235 detects when the window is in a safety control region except a safety control mode disabling region within a preset range near to the position where the window is completely closed. The safety control operation is allowed within only the safety control region.

The position detect signal from the position sensor 208 is input to window position detector 236 for detecting the absolute position of the window. The position of the opening or closing window in the region near the position where the window is completely closed is accurately detected by the window position detector 236. The output signal from the detector 236 is input to the safety control region recognizing unit 235 and to the reference value setting unit 242. It is used for detecting the safety control region and for setting a reference value for object-caught detection.

In the operation for detecting the safety control region, the output signal of the safety control region recognizing unit 235 is input to a first input terminal of an AND gate 237, and is also applied to an operation instruction unit 238. The operation instruction unit 238 outputs to the motor drive circuit 232 an operation instruction which depends on the state of the switch 231.

The system for detecting the state where an object is caught in the window includes a motor speed sensing unit 239 for detecting the speed of the motor by sensing the time intervals of the signals from the speed sensor 213, and an object-caught detector 240 for detecting the object-caught state by sensing a reduction of the speed of the motor. The speed reduction detection results from the process of comparing the sensed speed and the reference value. The output signal of the object-caught detector 240 is input to the other input terminal of the AND gate 237. The output signal of the AND gate 237 is input to the safety control operation instruction unit 241. Upon receipt of the object-caught signal, the safety control operation instruction unit 241 controls the operation instruction unit 238 for effecting a safety control operation. In the safety control operation, the window glass is moved 12 cm from the current position of the window glass in the opening direction.

The reference value setting unit 242 for setting the reference value for the object-caught detection is connected to the object-caught detector 240. A position signal from the window position detector 236, which detects the window position using the signal from the position sensor 208, is applied to the reference value setting unit 242. The reference value to be set for the object-caught detector 240 is changed according to the value of the position signal.

In the power window apparatus thus constructed, when the motor 211 starts to operate, the speed sensor 213 sends pulse signals to the microcomputer 230. The motor speed sensing means 239 detects the motor speed according to the time intervals of the pulse signals. When the motor speed is below the reference speed, the object-caught detector 240 outputs an object-caught signal. Either the absolute speed or the relative speed may be used for the motor speed.

The absolute speed is obtained in a manner wherein the time interval between the adjacent leading edges of the pulse signals is detected and the motor speed is calculated using the detected time interval. The relative speed is obtained by calculating a rate of change of time intervals of the pulse signals, e.g., time intervals between the adjacent leading edges.

The direction detector 233 detects the direction of rotation of the motor 211, i.e., the opening or closing direction of the window, using the pulse signals from the speed sensor 213. In the opening/closing position detector 234, the counter contained therein counts up or down according to the direction of motor rotation and the amount of the motor rotation. The resultant count of the counter provides the present position of the window. The safety control region recognizing unit 235 determines whether or not the window is within the safety control region on the basis of the output signal of the opening/closing position detector 234. If it is within the safety control region, it applies the output signal to the AND gate 237.

When the window is substantially completely closed, a part of the slider 203 supporting the window comes in contact with the distal end of the sensing lever 226 of the position sensor 208. The slider pushes the sensing lever 226 to turn in one direction. The movement of the window, which is reduced in accordance with the lever ratio of the sensing lever 226, is transferred to the potentiometer 222. If the ratio of the length of the lever from the pin to the distal end of the sensing lever and the length from the pin to the base end is set to approximately 5:1, 25 mm of movement of the window is reduced to approximately 5 mm. In this case, a small potentiometer 222 of which the full stroke is 5 mm may be used. That is, 5 mm is enough to cover the distance (usually approximately 15 mm) of the window movement from the run channel region to the completely closed position.

As a result, the resistance of the potentiometer 222 is changed, and the position sensor 208 produces a voltage corresponding to the amount of slider movement, where the system is designed so that the power source voltage of the microcomputer 230 is divided by the potentiometer 222, the divided voltage, which depends on the current position of the window, will be output from the position sensor 208.

Figure 14:
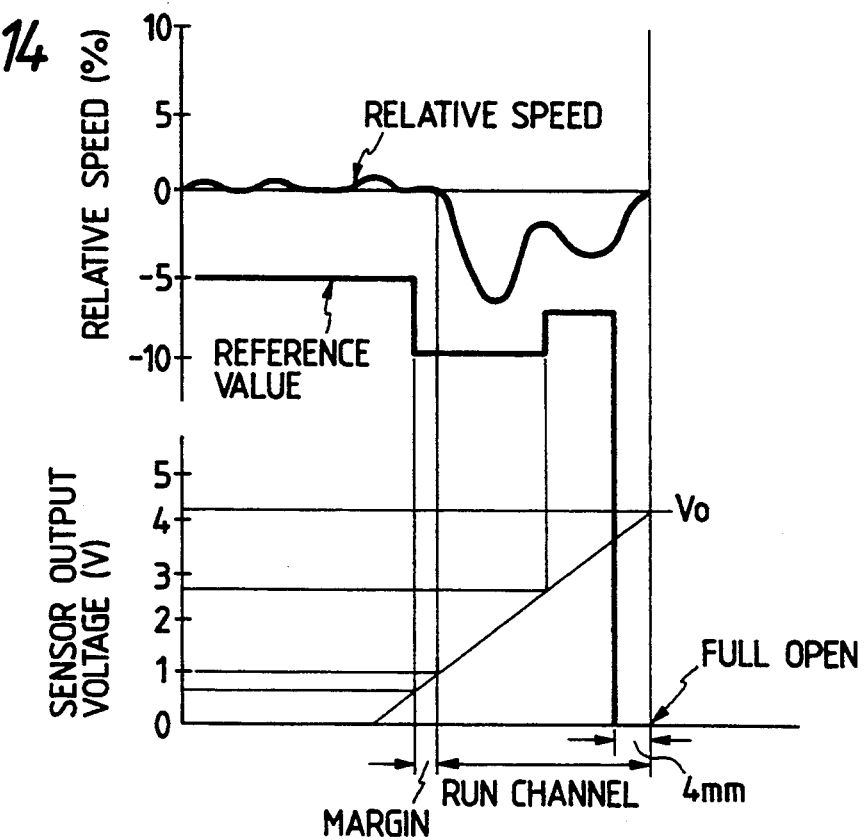
FIG. 14 is a graph showing the relationship of the motor speed and the output signal of a position sensor in a region just before the window is completely closed.

The output signal from the position sensor 208 is input to the window position detector 236, which detects the current position of the window. As seen from FIG. 14 showing the relationship of the output voltage of the position sensor 208, which depends on the position of the opening/closing window, and the motor speed (relative speed), if the voltage output from the position sensor when the window is completely closed is set to the reference voltage $V_0$, the current position of the window can be detected in the form of the difference of the reference voltage $V_0$ and the detected voltage $V_x$. The position sensor 208 continuously detects the window position and outputs the voltage also continuously. Therefore, the voltage difference can be measured precisely.

If the detected window position is input to the safety control region recognizing unit 235, the detection of the safety control region near the position where the window is completely closed can be carried out with high precision. The power window apparatus of this embodiment can detect a small distance of about 4 mm immediately before the window is completely closed, and hence can manage the region for disabling the safety control mode accurately.

Figure 15:
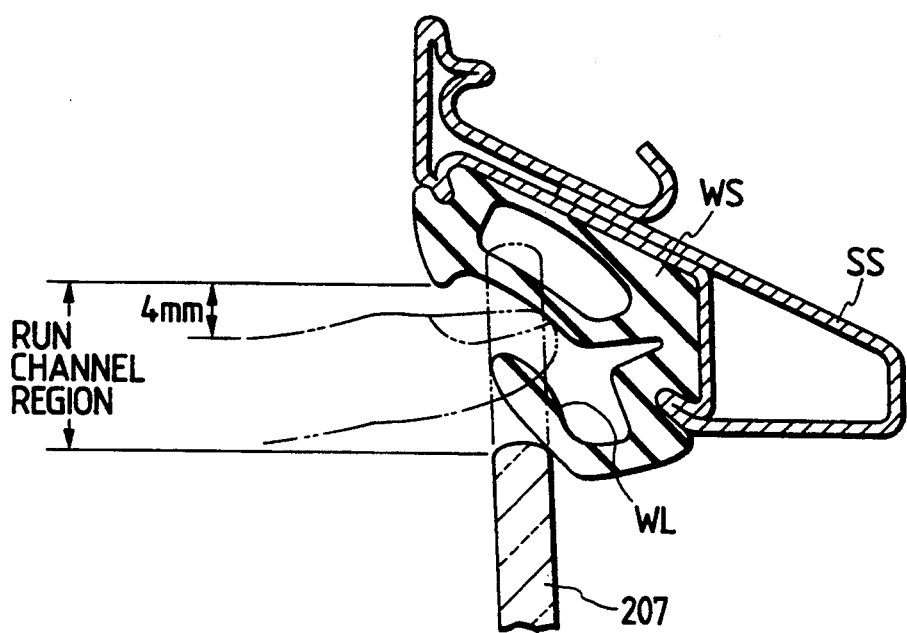
FIG. 15 s a cross-sectional view showing an example of a window strip.

The output signal of the window position detector 236 is input to the reference value setting unit 242. The position where the window comes in, contact with the weather strip is previously stored depending on the configuration of the weather strip. In connection with the stored position, the reference position for the object-caught detection operation is set up. In the case of a weather strip having the cross-sectional shape as shown in FIG. 15, the channel region where the window glass 207 comes in contact with the weather strip WS is about 15 mm away from the position where the window is completely closed. Accordingly, the reference value setting unit 242 changes the reference value in this run channel region.

As shown in FIG. 14, in the safety control region except the run channel region, the reference value is substantially constant. In the run channel region, the reference value is set below the value in the safety control region in accordance with the variation of thee output voltage of the position sensor. Accordingly, even when the window glass comes in contact with the weather strip, and the window closing operation is impeded by the resistance generated and its relative speed is reduced, the power window apparatus will not recognize it as an object-caught state. In this embodiment, the load actually applied to the motor is measured, and a reference value suitable for the measured load is used. Accordingly, the reference value is set to a relatively high value in the region immediately before the safety control region terminates, i.e., the region, where the window is substantially completely closed. Actually, to gain a broader margin, the reference value is preferably set immediately before the channel region starts.

The object-caught detection signal is input to the AND gate 237. At the same time, the signal from the safety control region recognizing unit 235 is applied to the AND gate 237. Since the gate is enabled by the signal from the safety control region recognizing unit 235, the object-caught detection signal is allowed to pass to the safety control operation instruction unit 241. The safety control operation instruction unit 241 operates the operation instruction unit 238 to effect a safety control operation. In the safety control operation, the operation instruction unit 238 inverts the polarity of the current applied to the motor 211 by the reference value setting unit 242. Then, the motor is reversely turned to open the window glass to leave a preset open space of about 12 cm long, and then is stopped. As a result, the object is released from its state of being caught in the window.

The position sensor 208 directly detects the position of the window when it is moved. Accordingly, if the damper 216 of the power window unit 206 is twisted in the rotation direction, no error is caused in the detection of the quantity of movement. Thus, the position of the window can be detected accurately.

As mentioned above, the potentiometer 222, as a key component of the position sensor 208, is placed within a casing constructed so as to prevent entrance of liquid. Accordingly, the potentiometer 222 is protected from water reaching the power window apparatus through the window. In this respect, it is free from the problems of short-circuiting and corrosion, securing high reliability.

When the window is moved in the opening direction, the distal end of the sensing lever 226 is brought into resilient contact with the slider 203 by the spring 224 contained in the potentiometer 222 of the position sensor 208. The contact of these members then continues. Accordingly, the movement of the slider is reliably detected, and an accurate position detection signal is produced.

In the state just before the window is completely closed, the current position of the window is detected. The reference value for object-caught detection is set on the basis of the detected position of the window. Accordingly, the object-caught state can be detected at a high sensitivity. Further, there are eliminated the erroneous detection of object-caught state and the erroneous operation for fully closing the window.

As for the position sensor for sensing the position of the moving window, with the provision of the reduction portion in the sensor, the positions of the window can be sensed in a broad range. Further, waterproof performance and highly reliable detection are secured.

What is claimed is:

1. An automotive power window apparatus with a safety device for carrying out a safety control operation upon detection of a state where an object is caught in a window driven by a motor, said apparatus comprising:
   a movable window glass;
   a motor for driving said window glass;
   a window-moving mechanism for converting rotational movement of said motor to opening or closing movement of said window;
   a first detector for detecting a rate of rotation of said motor;
   an object-caught detector operating in response to said first detector for detecting when an object is caught in said window;
   a second detector for detecting an absolute position of said window;
   a safety control region detecting unit operating in response to said second detector for detecting the presence of said window glass in a safety control mode disabling region within a predetermined distance of a fully closed position of said window; and
   an operation unit for controlling said motor for opening and closing said window and for performing a safety control operation to move said window in an opening direction when said object-caught detector indicates a state of an object being caught in said window, except when said safety control region detecting unit indicates said window glass is in said safety control mode disabling region.

2. The automotive power window apparatus of claim 1, wherein said first detector comprises a disc-like magnet mounted on a rotating shaft of said motor, and a pair of Hall elements disposed adjacent said disc-like magnet.

3. The automotive power window apparatus of claim 1, wherein said second detector comprises a ring-like multi-pole magnet fixed to a portion of said window-moving mechanism moving with said window, and a pair of Hall elements disposed adjacent said ring-like multi-pole magnet.

4. The automotive power window apparatus of claim 3, wherein said window-moving mechanism comprises a worm gear fixed to a rotating shaft of said motor, a worm wheel engaged with said worm gear, a damper having an input side coupled to said worm wheel, a pulley coupled to an output side of said damper, and a wire wound around said pulley, said ring-like multi-pole magnet being fixed to said output side of said damper.

5. The automotive power window apparatus of claim 4, wherein said damper comprises a center rubber plate, and a pair of metal plates, forming said input and output sides, respectively, fixed to opposite sides of said rubber plate.

6. The automotive power window apparatus of claim 1, wherein said second detector comprises a potentiometer disposed adjacent said window glass near said fully closed position of said window, said potentiometer being operated by said window glass as said window glass approaches said fully closed position.

7. The automotive power window apparatus of claim 6, wherein said potentiometer comprises a resistor member mounted on a substrate, an actuator member slidably disposed on said resistor member, an operating rod connected to said actuator member, and a spring for urging said operating rod in a direction to engage said window as said window glass approaches said fully closed position.

8. The automotive power window apparatus of claim 7, wherein said window-moving mechanism comprises a slider coupled to said window glass, said operating rod engaging said slider.

9. An automotive power window apparatus with a safety device for carrying out a safety control operation upon detection of a state where an object is caught in a window driven by a motor, said apparatus comprising:
- a movable window glass;
- a motor for driving said window glass;
- a window-moving mechanism for converting rotational movement of said motor to opening or closing movement of said window;
- a first detector for detecting a rate of rotation of said motor;
- an object-caught detector operating in response to said first detector for detecting when an object is caught in said window by comparing an output of said first detector with a reference value;
- a second detector for detecting an absolute position of said window in a region adjacent to a fully closed position of said window;
- a reference value setting unit for setting said reference value in accordance with an output of said second detector; and
- an operation unit for controlling said motor for opening and closing said window and for performing a safety control operation to move said window in an opening direction when said object-caught detector indicates a state of an object being caught in said window.

10. The automotive power window apparatus of claim 9, wherein said second detector comprises a sensor member moved by one of said window glass and a member fixed to said window glass, a motion reducing member for reducing motion produced by said sensor member when said sensor member is moved, and a signal generating member for producing an output signal in response to the reduced movement of said motion reducing member.

11. The automotive power window apparatus of claim 10, wherein said sensor member and said motion reducing member comprise a sensing lever pivotably mounted so that said lever has long and short ends with respect to a pivot point, said sensor member comprising said long end and said motion reducing member comprising said short end.

12. The automotive power window apparatus of claim 11, wherein said signal generating member comprises a slide-type potentiometer having a sliding actuator member coupled to said short end of said sensing lever.

13. The automotive power window apparatus of claim 12, wherein said window-moving mechanism comprises a slider coupled to said window glass, a portion of said slider engaging and moving said sensor member.

14. The automotive lower window apparatus of claim 9, further comprising a safety control region detecting unit operating in response to said second detector for detecting the presence of said window glass in a safety control mode disabling region within a predetermined distance of a fully closed position of said window, said safety control operation being disabled in said safety control mode disabling region.

* * * * *